Figure 1:
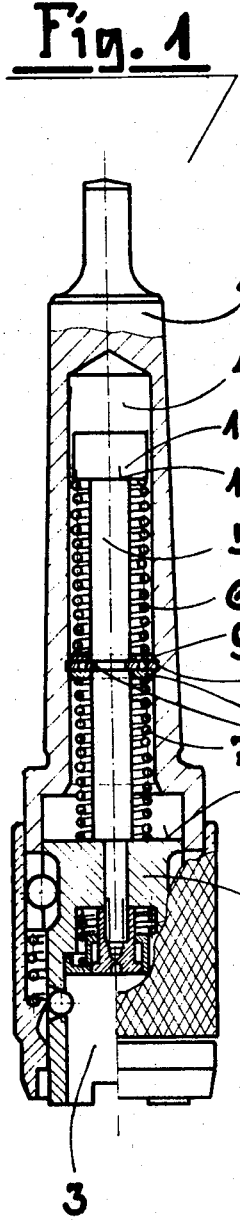

United States Patent [19]
Schmidt

[11] 3,751,051
[45] Aug. 7, 1973

[54] QUICK-CHANGE CHUCK WITH LONGITUDINAL COMPENSATION FOR THREAD-CUTTING TOOLS

[75] Inventor: Wolfgang Schmidt, Lauf, Germany

[73] Assignee: Emuge-Werk Richard Glimpel Fabrik, Fur Prazisions-Werkzeuge vorm Moschkau & Glimpel, Lauf, Germany

[22] Filed: Sept. 14, 1971

[21] Appl. No.: 180,390

[52] U.S. Cl. .................. 279/16, 10/89 F, 408/239, 10/141 H
[51] Int. Cl. ............................................. B23q 3/12
[58] Field of Search............ 10/89 F, 129 R, 135 R, 10/141 H; 279/16; 408/238, 239, 240

[56] References Cited
UNITED STATES PATENTS
3,214,773  11/1965  Benjamin et al. .................. 10/135 R

*Primary Examiner*—Francis S. Husar
*Attorney*—Holman & Stern

[57] ABSTRACT

A quick-change chuck for thread-cutting tools or the like, having a shaft with an axial bore therein, and an axially movable tool-holding portion including a bolt extending into the axial bore of the shaft. A pair of axially aligned compression springs are disposed within the axial bore and engaging the interior of the shaft and the tool-holding portion. A pair of transverse washer-like stop members are provided, one secured to the interior of the bore and the other to the bolt, whereby one of the springs will be compressed under compression of the chuck and the other spring will be compressed under tension of the chuck, the non-affected spring in each case remaining unstressed.

5 Claims, 3 Drawing Figures

QUICK-CHANGE CHUCK WITH LONGITUDINAL COMPENSATION FOR THREAD-CUTTING TOOLS

The invention concerns a quick-change chuck for thread-cutting tools, with an axial longitudinal compensation, which affects push and pull and is particularly applicable for use in thread-cutting on machines with positive spacing to avoid the breakage of work tools.

This type of quick-change chuck with axial longitudinal compensation balances possible differences between the thread-pitch of the machine-feed-screw and the feed of the screw tap and thereby preventing, by utilizing respective overload-units, the breaking of tools during the contact of the screw-tap on the bore-base, through the longitudinal compensation which is effected by means of pressure, or also during the possible jamming of the screw-tap; i.e., in a case when the screw-tap stops and the feed-screw continues to function. The axial longitudinal compensation under tension is, for instance, effective when, during the return of the machine-feed-screw, the screw-tap shall move out of the cut thread and is held back under special circumstances, as, among others, may happen through the attaching of boring material.

There exist in the prior art numerous types of quick-change chucks of such an embodiment, as, for example, is disclosed in French Pat. No. 1, 193,303. This type of bushing means has, however, the disadvantage that it is of an extensive length because of the arrangement of the compensator spring, and therefore cannot be used on machines in which the distance of the boring spindle to the seat of the workpiece is not large enough to accommodate such long construction; in addition, it increases the danger of a misalignment when there exists an enlarged distance of the front edge of the work tool to the boring spindle, especially when horizontal spindles are used.

A different quick-change chuck of this type, according to the German Printed Application No. 1,286,877, shows also a disadvantage inasmuch as this chuck functions only with the use of one compensator spring, in that the length of the pre-stressed spring with its end-rings in a mounted position must precisely comply with the distance of the two mating edges in the shaft-boring, since otherwise a free play would result which, during the mounting of the bushing piece on automatic or programmed machines, through the precise programming of the working paths, would result in certain technical/manufacture defects, and therefore necessitates the precise arrangement of the precise arrangement of the attached bearing-spacers before the bushings are mounted, whereby the mounting costs are resultantly much higher.

A further disadvantage of this type of bushing resides in the fact that by using only one spring, it becomes inpossible, in some cases, to provide for the required variable setting of the spring-tension during the respective push/pull stress of the bushing.

The instant invention has as its objective to provide for a quick-change chuck with a longitudinal balance of the tension and/or compression stresses, which is characterized by its short length of construction; by an axial movement which is free from play; by its adaptability to various pressure-settings during compressional and tensional forces, as well as by its uncomplicated assembly.

This task is solved by the present invention, characterized in that two pre-stressed compression springs are consecutively arranged on a spring bolt which is fixedly connected with an axially movable bushing piece, whereby said compression springs support themselves with their ends facing away from each other on a bearing area at the beginning and the end of a section of the spring bolt, which section extends from the bushing piece, and whereby the spring ends which face each other respectively abut against the opposite faces of a horizontal or transverse piece which is fixedly connected with the inside of the shaft, and further abut against a second horizontal or transverse member which is fixedly connected with the spring bolt.

Under the influence of compressional forces, the lower compression spring is pushed against the horizontal or transverse member, which is connected with the shaft, by means of the bearing area of the bushing piece at the lower end of the spring bolt, whereas the pre-stressed upper compression spring finds no change in its position between the bearing surface and the upper end of the spring bolt and the horizontal or transverse member of the spring bolt.

Under tensional forces, the upper compression spring is pushed at the upper end of the spring bolt against the horizontal or transverse member which is connected with the shaft, whereby the prestressed lower compression spring finds no change in its position between the bearing area at the lower end of the spring bolt and the horizontal or transverse member at the spring bolt.

Since the horizontal or transverse member at the spring bolt is in its size equal to the horizontal member in the shaft, the two ends of the spring, when the longitudinal compensation is not utilized, are pushed against the horizontal or transverse member in the shaft and thus push the horizontal or transverse member at the spring bolt plane parallel to the horizontal or transverse member in the shaft. In this way, a complete elimination of an axial free play is quaranteed.

One support disc is arranged between the spring ends facing each other and the horizontal or transverse members which are effectively arranged in the inside of the shaft as well as on the spring bolt, for holding and guiding the mounted springs.

By utilizing two compression springs of various lengths or various wire-diameters, it becomes possible that various pressures for the pull/push-stress are achieved.

Figure 2:
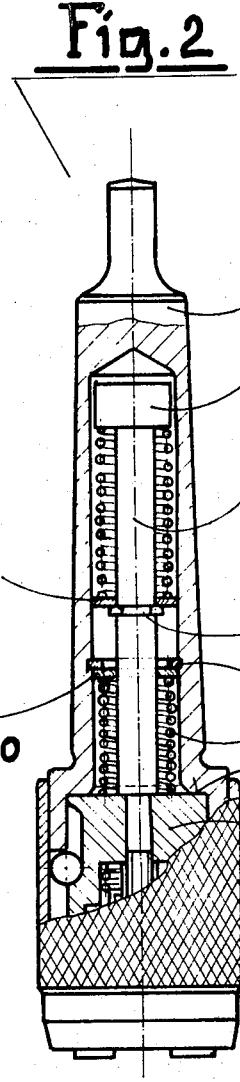
Figure 3:
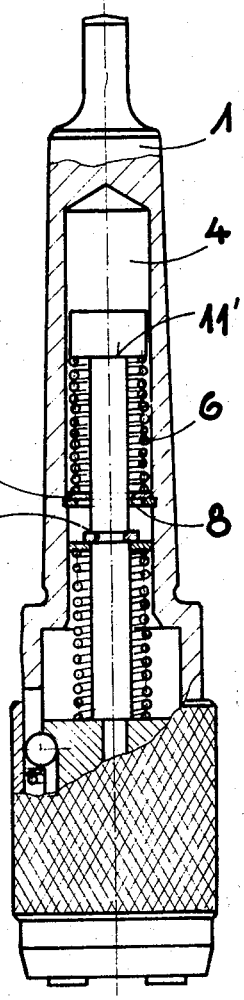

One embodiment is illustrated in the drawing and described in detail in the following, wherein FIG. 1 illustrates an axial cross-section through the bushing piece of the present invention in its unstressed condition;

FIG. 2 is a cross-section similar to FIG. 1, showing the bushing under axial compression; and FIG. 3 is a cross-section similar to FIG. 1, showing the bushing under axial tension.

The quick-change chuck according to the present invention comprises a shaft 1, and a bushing member 2 which is axially movably arranged in the lower section of the shaft in the known manner; the bushing member 2 includes at its lower end an axially disposed bore 3 for accepting a known prior art interchangeable thread-cutting unit or tool. Provided on the inside of the shaft is a further axial bore 4 into which enters a spring bolt 5 which is fixedly connected with the bushing member 2. A pre-stressed upper compression spring 6 for tensile stresses and a pre-stressed lower compression spring 7 for compression loads are mounted on this spring bolt 5.

In order to secure the bushing member 2 together with the spring bolt 5 in a particular position relative to the shaft 1, a first or outer horizontal or transverse annular stop member 8, preferably in the form of a washer and having an enlarged central opening, is arranged in the axial bore 4 at a predetermined height and is secured stationary relative to such bore, said first horizontal member having, for example, the shape of a circlip or spring ring, against the opposite sides of which the upper and the lower compression springs 6 and 7 respectively abut. A pair of axially movable upper and lower support discs 9 and 12 respectively support and are secured to the mounted compression springs 6 and 7. For the purpose of providing support for the upper cpmpression spring, the spring bolt 5 is provided with a head 11 having a depending annular shoulder 11' defining a bearing area, while the bushing piece 2 together with its upper bearing surface 13 serves as a support for the lower compression spring in the instant case. In order that the spring tension of each of the pre-stressed compression springs is fully effective from the beginning of application of stress, a second or inner horizontal or transverse stop member 10, being of the identical thickness as the horizontal member 8 and advantageously also formed as a circlip, is mounted in the axial bore 4, and is arranged on and secured to the spring bolt 5 at a pre-determined distance from the bearing areas 11' and 13. The first or outer horizontal member 8, when the device is in the substantially unstressed condition illustrated in FIG. 1, occupies substantially the same axial position between the two support discs 9 and 12, as the horizontal member 8 in the shaft boring. If now the two springs are utilized, the second or inner horizontal member 10 prevents at the spring bolt 5 a counter-acting of the non-utilized springs, in that such second horizontal member 10 retains the non-utilized springs in their starting position as shown in FIG. 2 during the applicational or compressional forces, and as shown in FIG. 3, during axial tensile stress (springs 6 and 7, respectively). Through the adjustment of the two horizontal members 10 and 8 to an alternately precise plane strength, an axially free play of the bushing piece 2 with its spring bolt 5 within the shaft boring 4 is prevented during non-applicaon of the longitudinal adjustment.

As will be appreciated particularly from FIGS. 2 and the the second or inner horizontal member 10 has an outer diameter sufficiently small to pass freely in the axial direction through the enlarged central opening in the first or outer horizontal member 8. Thus, it will be seen that the inner or second horizontal member 10 retains the non-affected spring against compression while the outer or first horizontal member 8 compresses the other spring, both under tension and compression of the bushing. In particular, as shown in FIG. 2, under compression the inner horizontal member 10 retains the upper spring 6 in its ubstressed condition, while the outer horizontal member 8 compresses the lower spring 7. Under tension. as shown in FIG. 3, the reverse is true, the inner horizontal member 10 retaining the lower spring 7 in its unstressed condition while the outer horizontal member 8 compresses the upper spring 6.

In the bushing as shown in FIG. 1, the horizontal member 10 is arranged on the spring bolt 5 in such a way that the identical path is available for both compensational directions (compression or tension). By changing the distance of the horizontal member 10 to the lower edge or shoulder 11' of the spring bolt head, it becomes possible that the path of the two compensational directions are lengthened for one direction and shortened for the other.

The advantages gained with the instant invention in its entirety reside in the extremely short construction of the bushing which enables its utilization when lack of space prevails, as well as the absolutely smooth longitudinal balancing of push and pull by means of two pre-stressed compression springs, whereby, through the use of various springs, the push/pull-stress may be of various settings; this is of especial advantage for programmed machineries, since a stronger ingate pressure is desired here for obtaining an always equal depth of thread, and during the interchanging and unscrewing of the tap-drill from the workpiece a somewhat softer compensation is desired in order to avoid breaking of the working tool.

A further advantage is in the possibility that, by changing the mounting position of the center horizontal member 10 on the spring bolt, the path of the two compensational directions consisting of push and pull can be changed selectively.

What is claimed is:

1. A chuck having means for directly compensating for pushing and pulling forces applied thereto, comprising, in combination, an elongated shaft member including an axial bore opening into one end thereof and a bushing housing; a bushing member mounted for axial movement in said housing, including means for receiving a replaceable tool piece and an elongated bolt integrally connected thereto and extending axially within said shaft bore for relative reciprocable movement therein, the improvement in which said means for compensating for pushing and pulling forces comprising an abutment intermediately of and fixed relative to said shaft bore, said bolt having relative reciprocable movement with respect to said abutment; opposed, axial, lower and upper spring members circumposed about said bolt and having adjacent confronting ends engaging opposite sides of said abutment, the remote end of the lower spring member directly engaging on said bushing member, the remote end of said upper spring member abuttingly engaging said bolt above said fixed abutment, excessive axial pressure on said shaft member on said bushing member causing the lower spring abutting the bushing member to compress, and excessive tension on the shaft member, in an opposite direction, causes the upper spring member to compress in relation to said bolt whereby damage to the tool piece is obviated.

2. The structure as claimed in claim 1 in which said bolt includes an intermediate abutment fixed thereto and reciprocable axially beyond both sides of the fixed abutment in the shaft member bore, and an abutment element engaged by the intermediate abutment fixed on said bolt when it moves beneath the fixed abutment in the shaft member bore.

3. The structure as claimed in claim 2 including an abutment element engaged between the lower end of said upper spring for engaging the upper surface of said fixed abutment and engaged by the intermediate abutment on said bolt when the intermediate abutment on the bolt moves above said fixed abutment.

4. The structure as claimed in claim 3 in which the abutment elements engaging the confronting ends of said springs substantially conform to the cross section of the shaft bore for guidingly engaging the shaft bore as the springs are compressed.

5. The structure as claimed in claim 1 in which said bolt includes a terminal head having a shoulder providing an abutment with which the remote end of said upper spring is engaged.

* * * * *